(12) United States Patent
Terzagi

(10) Patent No.: US 6,820,862 B2
(45) Date of Patent: Nov. 23, 2004

(54) WIRE STRAINER

(75) Inventor: Andre Terzagi, Auckland (NZ)

(73) Assignee: Tru-Test Limited, Mount Wellington (NZ)

( * ) Notice: Subject to any disclaimer, the term of this patent is extended or adjusted under 35 U.S.C. 154(b) by 309 days.

(21) Appl. No.: 09/996,164

(22) Filed: Nov. 27, 2001

(65) Prior Publication Data

US 2002/0063247 A1 May 30, 2002

(30) Foreign Application Priority Data

Nov. 27, 2000 (NZ) .............................................. 508449

(51) Int. Cl.⁷ ................................................ B66F 3/00
(52) U.S. Cl. ....................... 254/223; 254/213; 254/217
(58) Field of Search ................................ 254/213, 217, 254/218, 223; 74/577 M, 578

(56) References Cited

U.S. PATENT DOCUMENTS

| | | | | |
|---|---|---|---|---|
| 4,222,550 A | | 9/1980 | de Bosredon | 254/223 |
| 4,475,854 A | | 10/1984 | Ericsson | 410/103 |
| 5,282,296 A | * | 2/1994 | Huang | 24/68 CD |
| 5,894,638 A | * | 4/1999 | Huang | 24/68 CD |
| 6,007,053 A | * | 12/1999 | Huang | 254/247 |
| 6,095,450 A | * | 8/2000 | Jang | 242/388.5 |
| 2002/0153518 A1 | * | 10/2002 | Huang | 254/223 |

FOREIGN PATENT DOCUMENTS

| | | |
|---|---|---|
| NZ | 54071 | 7/1925 |
| NZ | 56587 | 6/1926 |
| NZ | 216451 | 6/1986 |

* cited by examiner

Primary Examiner—Kathy Matecki
Assistant Examiner—Evan Langdon
(74) Attorney, Agent, or Firm—Blakely Sokoloff Taylor & Zafman

(57) ABSTRACT

A wire strainer intended for straining of wire in a fence structure. The wire strainer includes a body 12 with which a spool 11 having a plurality of teeth 18 is rotatably mounted. An engagement member 12 extend between and is slidingly engaged in elongate slots 20. Legs 24 of the engagement member 21 slidingly engage with the inside wall surfaces of the divergent arms 15 of body 12. The legs 24 thus apply a force to the engagement member 21 so that it engages with the teeth 18. The engagement member 21 can be removed from contact with the spool 11 by sliding against the biasing effect of the legs 24 so as to engage with a step 27 in the elongate opening 20.

15 Claims, 1 Drawing Sheet

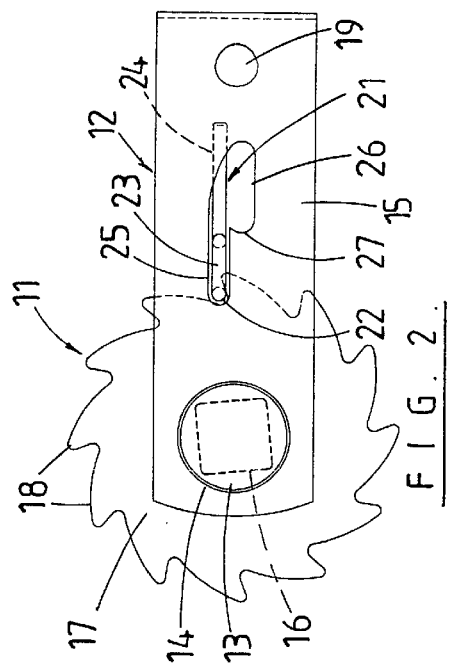
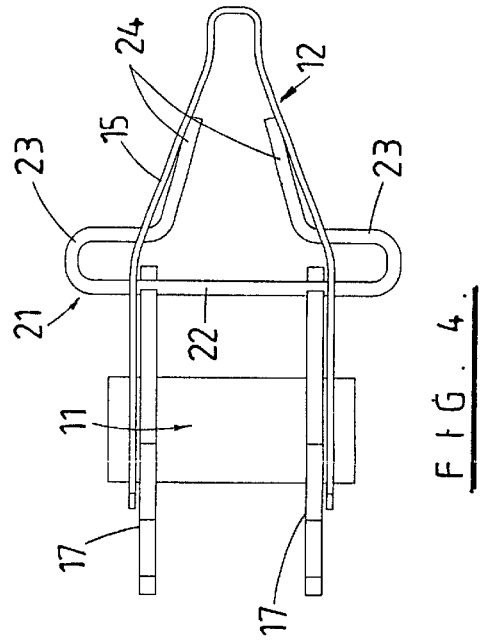
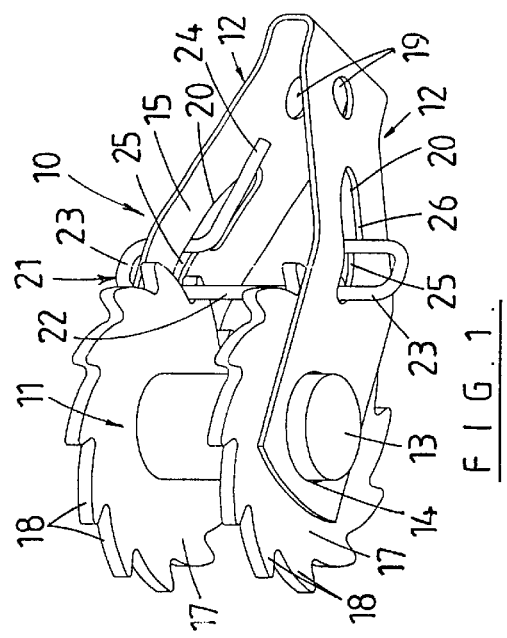
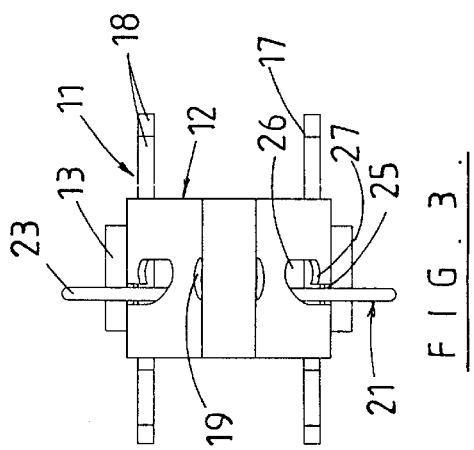

WIRE STRAINER

BACKGROUND TO THE INVENTION

This invention relates to a wire strainer.

The wire strainer of the present invention is primarily intended for the permanent straining of a wire in a fence structure. The wire strainer enables the fence wire to be tensioned. As is known, the wire strainer can then at any future time be used to adjust or remove the tension in the fence wire.

Wire strainers of this type have generally incorporated a body in which a spool is rotatably mounted. A ratchet arrangement is provided which enables the spool to be held against rotation under the action of the tension in the fence wire, or to free-wheel.

SUMMARY OF THE INVENTION

It is an object of the present invention to provide a wire strainer which has an improved arrangement which either overcomes disadvantages with known ratchet arrangements or at least gives the public a useful choice.

According to one broad aspect of the invention there is provided a wire strainer including a body with which a spool is rotatably mounted, a plurality of teeth rotatable with said spool and an engagement member to engage with said teeth, said engagement member arranged to permit the spool to rotate in one direction but prevent from rotation in a reverse direction, said engagement member being retained with the body for sliding movement relative to said spool, the engagement member incorporating an integral biasing means to bias the engagement member into engagement with said tooth or teeth of said spool.

BRIEF DESCRIPTION OF THE DRAWINGS

FIG. 1 is a perspective view of the wire strainer,

FIG. 2 is a side elevation view,

FIG. 3 is an end elevation view, and

FIG. 4 is a plan view.

DETAILED DESCRIPTION OF AN EMBODIMENT OF THE INVENTION

In line with known constructions of wire strainers the wire strainer 10 according to the present invention has a spool 11 rotatably mounted with a body 12. This body is sometimes referred to as the hangar. In the preferred embodiment as illustrated, stud axles 13 are rotatably located within openings 14 in the arms 15 of body 12. One of the stud axles 13 preferably includes an angular cross section portion 16 (see FIG. 2) with which a spanner, tool or other suitable operating member can be engaged to apply a rotational movement to the spool 11.

The spool 11 has a pair of spaced apart flanges 17. On the periphery of one or preferably both flanges 17 there is provided a plurality of teeth 18. In the preferred form these teeth 18 are angled forwardly.

In accordance with known constructions the body 12 is pressed from a single length of metal sheet in which are punched openings 14 and openings 19. These openings 19 align when the sheet metal is folded to form the shape of the body 12. The aligned openings 19 enable an anchoring means such as a length of wire to be threaded therethrough. Penetrations 20 are also formed in each of arms 15, these penetrations retaining a pawl 21 and being of a particular shape as will hereinafter be described.

The engagement member or pawl 21 for engaging with and controlling rotation of the spool 11 is, in the preferred form, constructed out of a single elongate element such as a length of stiff wire. This length of wire is bent so as to form an engagement length 22 which extends transversely across the body 12 and projects through each of the penetrations 20. The length of the wire is then bent back on itself, thereby forming a return portion 23 to project back through the penetration 20 and form a leg 24 which extends along the inside of the arm 15. The return portion 23 is located within an elongated slot portion 25 of the penetration 20.

Thus, in a normal wire tensioning operation of the strainer the pawl 21 is forced away from the spool 11 by the teeth 18 of the spool as the spool is rotated. This rectilinear movement of pawl 21 results in a wedging toward one another of the free ends of the legs 24 of the pawl 21. This wedging arises from the angled arms of body 12. The wedging action sets up a bias which causes the pawl 12 to snap back toward the spool 11 to engage the next teeth (or in the illustrated arrangement a pair of teeth) on the spool when the spool is rotated to the next tooth position.

The penetration 20 also includes a notch 26 which is located just beyond the position to which the pawl 21 will slide during normal operation. As can be seen more clearly from FIG. 2, this notch 26 is located at a level below the plane on which the pawl 21 will linearly translate in its normal operation. Consequently, a user of the wire strainer can slide the pawl 21 back manually beyond its normal extent of movement and thereby position the transverse member 22 of the pawl within the notch 26. Transverse portion 22 will thus engage against the curved end wall 27 of notch 26 so as to resist any biasing action applied by the wedging action on arms 24 by the inside wall surfaces of body 12. With the pawl held in such position, it is held disengaged from the spool thereby allowing the spool to free-wheel.

Previous wire strainer designs which have a sprung pawl require the user's fingers to be engaged within the general confines of the body when manually disengaging or re-engaging the pawl. This can lead to the likelihood of pinching of the user's fingers or some other form of injury caused by the proximity of the user's fingers with the spool (which may be under the action of a tensile force from the fence wire) or from the fence wire itself. Operator safety is therefore improved with the present wire strainer because movement of the pawl 21 to its disengaged position is achieved by the user manipulating the projecting portions 23 which as described project either side of the body 12.

A common tool for tensioning wires with existing wire strainer designs is one which comprises a lever with a fork on the end, notches on the end of the fork arms for engaging the hub of the spool and a means for engaging the teeth of the spool. When a tool of this type is used for releasing tension with the wire strainer incorporating the present invention, the fork arms will disengage the pawl from notch 26 which will automatically lock the rotation of the spool with a small re-tensioning motion of the tool rather than requiring the user to manually move the pawl back to its ratcheting position.

With existing known wire strainers of a type having a body, spool and pawl construction the body has parallel sides where the spool is mounted. These parallel sides, however, are required to extend beyond the periphery of the spool to allow for mounting and operation of the pawl. With the present invention however, the body may be bent inwards at the circumferential edge of the spool 11 which allows for reduced material use in the production of the body. It also reduces the tendency of the parallel arms 15 to spring open and release the spool 11 when tension is applied to the fence wire being strained.

In addition to these advantages it is also believed that a wire strainer incorporating the present invention will require fewer assembly operations. For example, the only assembly operation required is to close the hangar around the spool and pawl in a jig to hold the components in the correct alignment can be easily fabricated. With most other wire strainers it is necessary that the spool be assembled into the hangar and then the pawl assembled over the outside of the hangar in a second operation.

What is claimed is:

1. A wire strainer including a body having a pair of arms between which a spool is mounted for rotation about an axis of rotation, said spool being rotatable in one direction to, in use, strain a wire coupled to the spool, a plurality of teeth rotatable with the spool, an engagement member formed from a length of stiff wire a part of which forms an engagement portion extending transversely of the body and engageable with a tooth or teeth of the spool to prevent rotation of the spool about the axis of rotation in a reverse direction, the engagement member being retained with the body for sliding movement relative to the spool, at least one projection formed by the length of stiff wire, said projection being slidingly engaged with a surface which is inclined relative to the axis of rotation of the spool to establish a biasing force when the engagement member is slidingly moved to disengage the engagement portion from said tooth or teeth of the spool whereby the engagement member is biased to move such that the engagement portion re-engages with the tooth or teeth of the spool.

2. A wire strainer according to claim 1 wherein each arm includes an elongate opening, said elongate openings being disposed opposite one another, the engagement portion being slidingly engaged with each said elongate opening.

3. A wire strainer according to claim 2 wherein the arms converge from the spool toward a mounting means.

4. A wire strainer according to claim 3 wherein the body is formed from a single length of metal sheet, said length being folded to form said mounting portion and the pair of arms.

5. A wire strainer according to claim 1 wherein the at least one projection is a pair of legs extending from the engagement portion, each leg slidingly engaging with a respective one of the convergent arms.

6. A wire strainer according to claim 2 wherein each leg engages with an inner face surface of the arm.

7. A wire strainer according to claim 1 wherein the engagement portion projects for a distance beyond an outer surface of each arm.

8. A wire strainer according to claim 5 wherein at least one elongate opening includes a stop element against which the engagement portion can engage to prevent the engagement portion from engaging with said tooth or teeth of the spool.

9. A wire strainer according to claim 8 wherein each elongate opening includes a stop element.

10. A wire strainer according to claim 9 wherein the stop element is a shoulder or step formed in an edge of the elongate opening.

11. A wire strainer according to claim 1 wherein there are two projections each slidingly engaged with said inclined surface.

12. A wire strainer according to claim 11 wherein each inclined surface is formed by an arm of the body, said spool being rotatably mounted between the arms.

13. A wire strainer according to claim 12 wherein each arm includes an elongate opening, a portion of the engagement member engaged with and through each elongate opening.

14. A wire strainer according to claim 13 wherein at least one of the elongate slots includes a step or shoulder with which the engagement member can engage to retain the engagement member from making contact with said spool.

15. A wire strainer according to claim 13 further including a stop with which the engagement member can engage to prevent the engagement member from engaging with said tooth or teeth of the spool.

* * * * *